(12) United States Patent
Mori et al.

(10) Patent No.: US 7,177,014 B2
(45) Date of Patent: Feb. 13, 2007

(54) LIGHT WAVE DISTANCE MEASURING APPARATUS

(75) Inventors: Toshihiro Mori, Osaka (JP); Hirohiko Kawata, Osaka (JP); Shinichi Yuta, Tsukuba (JP)

(73) Assignee: Hokuyo Automatic Co., Ltd., Osaka-Fu (JP)

( * ) Notice: Subject to any disclaimer, the term of this patent is extended or adjusted under 35 U.S.C. 154(b) by 213 days.

(21) Appl. No.: 11/071,547

(22) Filed: Mar. 2, 2005

(65) Prior Publication Data

US 2005/0275827 A1 Dec. 15, 2005

(30) Foreign Application Priority Data

Jun. 15, 2004 (JP) ............................. 2004-177445

(51) Int. Cl.
*G01C 3/08* (2006.01)
(52) U.S. Cl. .................... 356/5.09; 356/5.01; 356/5.11; 356/5.15
(58) Field of Classification Search ............... 356/4.01, 356/5.01, 5.09, 5.1–5.15
See application file for complete search history.

(56) References Cited

U.S. PATENT DOCUMENTS

| | | | |
|---|---|---|---|
| 4,146,328 A | 3/1979 | Hullein et al. ............... 356/5 |
| 6,040,898 A * | 3/2000 | Mrosik et al. ............. 356/5.09 |
| 6,369,880 B1 | 4/2002 | Steinlechner ............... 356/5.11 |
| 6,483,595 B1 * | 11/2002 | Yakovlev et al. ............ 356/607 |
| 2002/0131035 A1 * | 9/2002 | Watanabe et al. ............. 356/5.1 |
| 2005/0024625 A1 * | 2/2005 | Mori et al. ................. 356/4.01 |
| 2005/0151956 A1 * | 7/2005 | Chien et al. ............... 356/5.11 |
| 2005/0168719 A1 * | 8/2005 | Stierle et al. ............... 356/4.01 |

FOREIGN PATENT DOCUMENTS

| | | |
|---|---|---|
| DE | 4303804 | 8/1994 |
| JP | 03-239984 | 10/1991 |
| JP | 07-063853 | 3/1995 |
| JP | 10-20036 | 1/1998 |

OTHER PUBLICATIONS

"Digital Laser Range Finder: Phase-Shift Estimation by Undersampling Technique" By Stephane Poujouly et al./ Nov. 29, 1999 Industrial Electronics Society/ pp. 1312-1317.

* cited by examiner

*Primary Examiner*—Thomas H. Tarcza
*Assistant Examiner*—Isam Alsomiri
(74) *Attorney, Agent, or Firm*—J.C. Patents

(57) ABSTRACT

A reference electrical signal oscillated by the main oscillator (11) has two kinds of frequencies ($f_1$, $f_2$) which are different from each other and any one of which is alternatively selected, a sampling signal is synchronized with the reference electrical signal once every n times, and a frequency ($f_s$) of the sampling signal is an average value of the two kinds of frequencies ($f_1$, $f_2$) of the reference electrical signal, and the A/D conversion portion carries out at least one A/D conversion per period of the reference electrical signal and the received electrical signal based on the sampling signal.

16 Claims, 6 Drawing Sheets

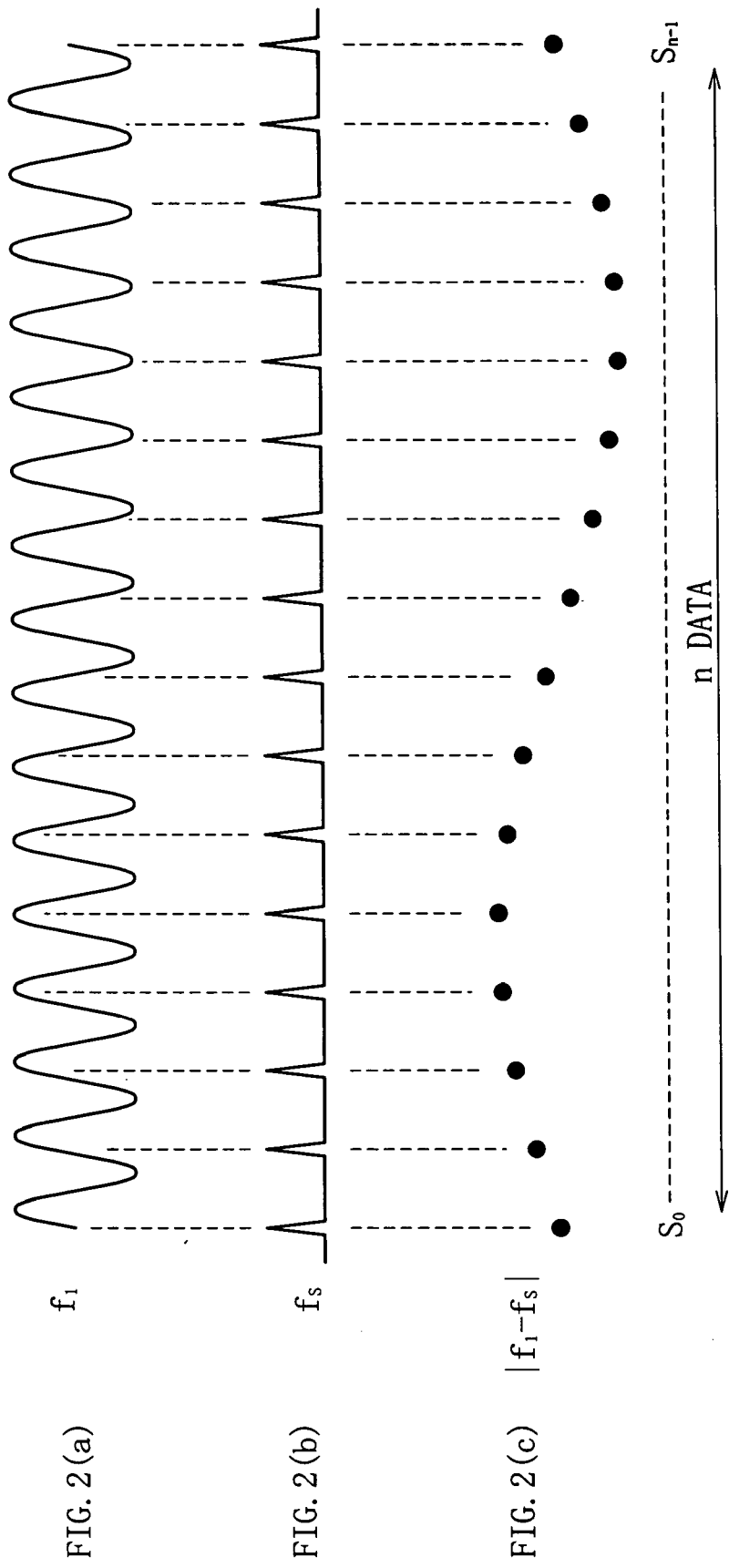

FIG. 3(a)
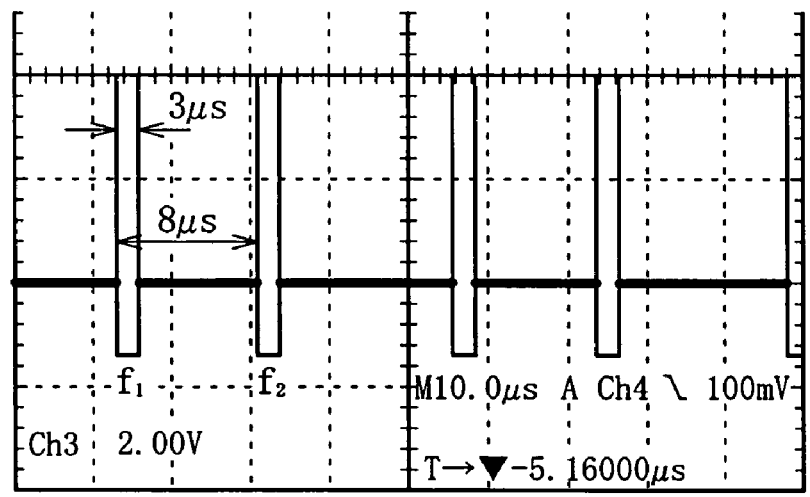
FIG. 3(b)
FIG. 3(c)
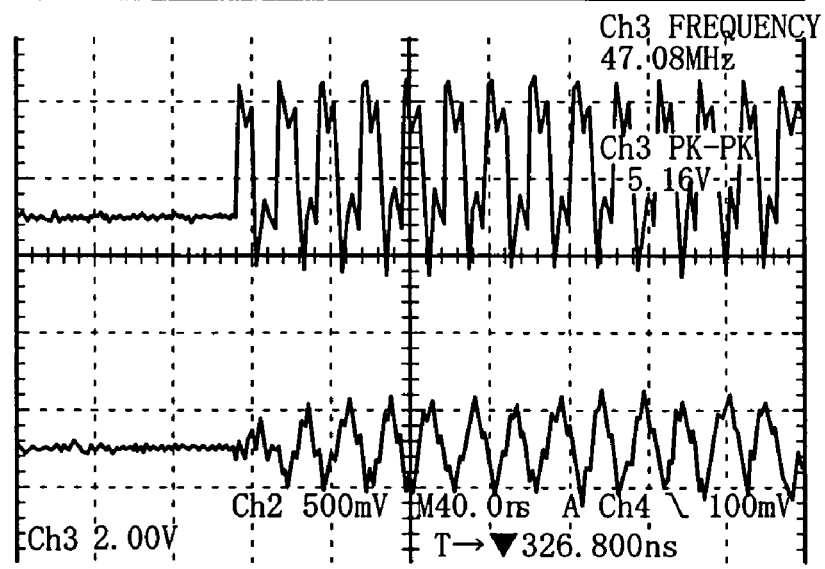

100mm

2000mm

4000mm

NO OBJECT TO BE MEASURED

LIGHT WAVE DISTANCE MEASURING APPARATUS

BACKGROUND OF THE INVENTION

1. Field of the Invention

The present invention relates to a light wave distance measuring apparatus for measuring a distance to an object to be measured by utilizing an amplitude-modulated light wave.

2. Related Background Art

As for a conventional light wave distance measuring apparatus, there are known one employing a time-of-flight (TOF) system, and one employing an amplitude modulation (AM) system.

The light wave distance measuring apparatus of the TOF system operates such that a distance measuring light emitted in pulse-like shape is applied to an object to be measured, and the distance measuring light reflected by the object to be measured is received to observe a distance to the object to be measured based on a time delay from a time point of the application of the distance measuring light to a time point of the reception of the distance measuring light (refer to JP 07-63853 A). The light wave distance measuring apparatus of this system requires a broadband amplifier and a very high speed arithmetic operation circuit, because, when the high precision is required for the measurement, an extremely short time must be measured. Thus, the light wave distance measuring apparatus of this system is difficult to be manufactured in terms of the technique as well, and the components or parts used therein become expensive. On the other hand, the light wave distance measuring apparatus of the AM system can be constructed with inexpensive components or parts, because the distance can be measured with high precision using a relative low frequency of several tens of MHz. For this reason, the AM system has been utilized in the light wave distance measuring apparatus requiring the wide use in many cases. The principles of the measurement in the AM system will hereinafter be described with reference to FIG. 7.

A distance measuring light which is amplitude-modulated with a signal having a frequency f is applied from a light source portion 70 such as a laser to an object 80 of measurement, and the distance measuring light reflected by the object 80 of measurement is received by a light receiving portion 90 such as an avalanche photodiode (APD). At this time, the received distance measuring light has a phase difference $\Delta\Phi$ corresponding to a distance L to the object to be measured. Then, when the phase difference $\Delta\Phi$ between the distance measuring light upon its application and the distance measuring light upon its reception is measured, the distance L can be obtained from Equation 1:

$$L = \frac{C}{2f} \times \frac{\Delta\Phi}{2\pi} \qquad \text{Equation 1}$$

where C is a light velocity.

Note that in the actual measurement, the frequency of the signal with which the distance measuring light is amplitude-modulated is changed by two or more kinds. The reason for adopting such a process resides in that it is avoided that the measurement becomes impossible for a distance equal to or longer than C/2f because when the distance L becomes a multiple of C/2f in Equation 1, the phase difference $\Delta\Phi$ becomes zero (refer to JP 2002-90455 A).

However, in the conventional light wave distance measuring apparatus of the AM system, in order to directly detect the phase difference between the distance measuring light upon its application and the distance measuring light upon its reception from the distance measuring light, the distance measuring light must be A/D-converted using a sampling signal having a frequency which is several times as high as that of the distance measuring light. For this reason, an expensive A/D converter is required which is responsible to the frequency of the sampling signal.

SUMMARY OF THE INVENTION

The present invention has been made to solve the above-mentioned problems, and it is an object of the invention to provide a wave light distance measuring apparatus. The wave light distance measuring apparatus includes: a light source portion for applying a distance measuring light amplitude-modulated with a reference electrical signal as a sine wave signal having a predetermined frequency to an object to be measured; a light receiving portion for receiving the distance measuring light reflected by the object to be measured to convert the received distance measuring light into a received electrical signal; A/D conversion means for A/D-converting the reference electrical signal and the received electrical signal based on a sampling signal; phase difference detecting means for detecting phases of the reference electrical signal and the received electrical signal which are A/D-converted by the A/D conversion means to subtract the phase of the reference electrical signal from the phase of the received electrical signal, whereby detecting a phase difference between the reference electrical signal and the received electrical signal; and distance detecting means for detecting a distance to the object to be measured based on the phase difference detected by the phase difference detecting means, in which the reference electrical signal has two kinds of frequencies which are different from each other and any one of which is alternatively selected, the sampling signal is synchronized with the reference electrical signal having the two kinds of frequencies once every n times, and a frequency of the sampling signal is equal to an average value of the two kinds of frequencies of the reference electrical signals, and the A/D conversion means carries out at least one A/D conversion per period of the reference electrical signal and the received electrical signal based on the sampling signal. Here, n represents an integer.

With the above-mentioned construction, each of the reference electrical signal and the received electrical signal is A/D-converted for its wavelength to be down converted using a signal having a frequency corresponding to a frequency difference between the reference electrical signal and the sampling signal. That is, the phase can be arithmetically operated by the A/D conversion means having a small arithmetic operation processing ability as compared with the case where the phase is directly detected from the signal waveform.

Further, the present invention may be constructed such that when one of the two kinds of frequencies of the reference electrical signal is assigned $f_1$, the other is assigned $f_2$, and the frequency of the sampling signal is assigned $f_s$, the relationship in Equation 2 is met:

$$f_1/f_s = (n+1)/n$$

$$f_2/f_s = (n-1)/n \qquad \text{Equation 2}$$

Further, the present invention may be constructed such that the distance measuring light is burst-emitted.

Further, the present invention may be constructed such that the phase difference detecting means removes a D.C. component contained in digital data of the reference electrical signal and the received electrical signal based on the received electrical signal during non-light emission of the distance measuring light converted into the digital data by the A/D conversion means.

Further, the present invention may be constructed such that the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

As described above, according to the present invention, when the distance measuring light is A/D-converted, no high speed arithmetic operation processing is required for the A/D conversion means. As a result, it is possible to provide the light wave distance measuring apparatus of the AM system with an inexpensive A/D converter.

BRIEF DESCRIPTION OF THE DRAWINGS

In the accompanying drawings:

FIGS. 2(a), 2(b), and 2(c) are a conceptual diagram showing a waveform of a received electrical signal, a conceptual diagram showing a waveform of a sampling signal, and a conceptual diagram showing a waveform of a restored signal, respectively;

FIGS. 3(a) and 3(b) are waveform charts each showing a distance measuring light upon its application in an emission state and FIG. 3(c) is a waveform chart showing a distance measuring light upon its reception in an emission state;

DESCRIPTION OF THE PREFERRED EMBODIMENTS

Figure 1:
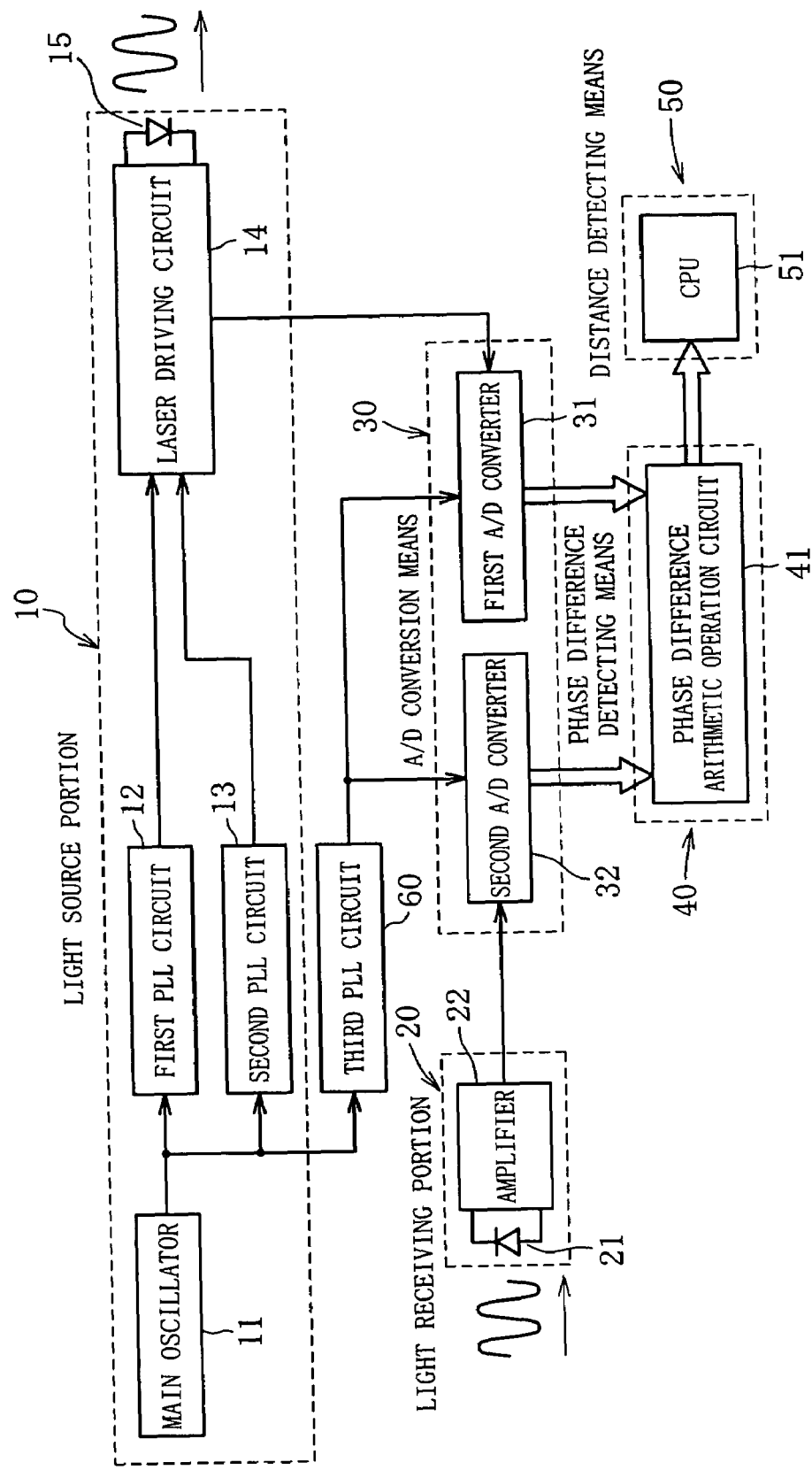
FIG. 1 is a block diagram showing a construction of a light wave distance measuring apparatus according to an embodiment of the present invention.
Figure 4A:
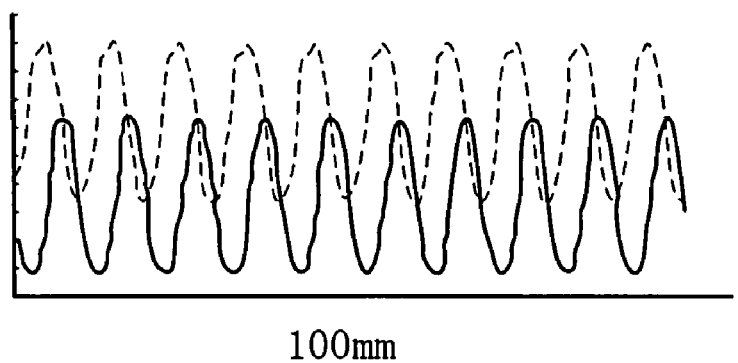
FIGS. 4(a), 4(b), 4(c), and 4(d) are waveform charts of restored signals, respectively.
Figure 4B:
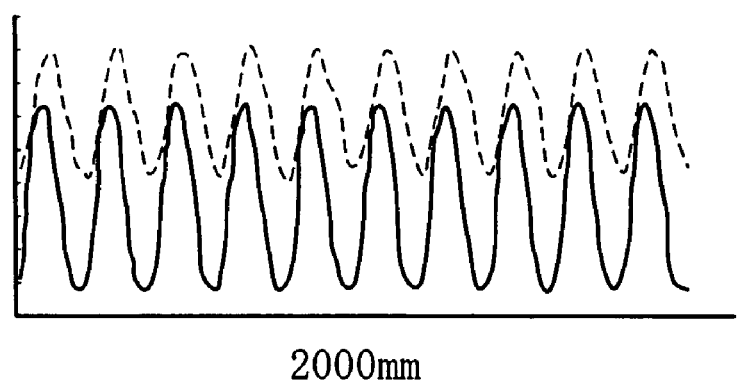
Figure 4C:
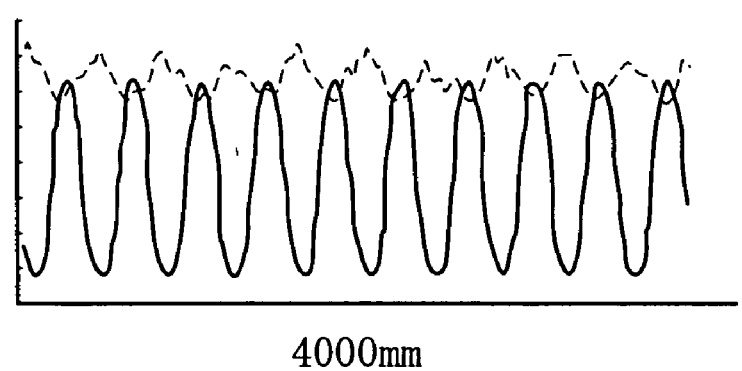
Figure 4D:
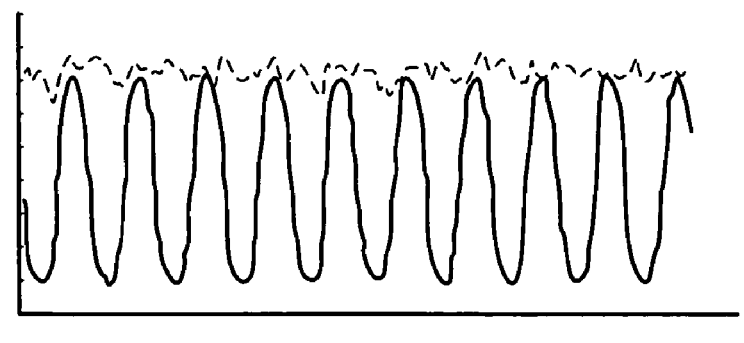

A light wave distance measuring apparatus according to an embodiment of the present invention will hereinafter be described with reference to FIG. 1. The light wave distance measuring apparatus includes: a light source portion 10 having a main oscillator 11, a first phase-locked loop (PLL) circuit 12, a second PLL circuit 13, a laser driving circuit 14, and a laser 15 as a light emitting element; a light receiving portion 20 having an avalanche photodiode (APD) 21 and an amplifier 22; A/D conversion means 30 having a first A/D converter 31 and a second A/D converter 32; phase difference detecting means 40 having a phase difference arithmetic operation circuit 41; and distance detecting means 50 having a CPU 51. Note that in this embodiment, a sampling signal is generated from a third PLL circuit 60. In addition, the first to third PLL circuits 12, 13, and 60 can be replaced with another suitable circuit for changing a frequency of an input signal to an arbitrary frequency to output the resultant signal, the laser 15 can be replaced with another suitable light emitting element, and the APD 21 can be replaced with another suitable light receiving element (and so forth). Hereinafter, a construction of the constituent elements will be described.

The main oscillator 11 oscillates a signal having a frequency $f_0$, and is connected to the first and second PLL circuits 12 and 13. The first and second PLL circuits 12 and 13 output two reference electrical signals as two sine wave signals having frequencies $f_1$ and $f_2$, respectively, from the signal having the frequency $f_0$ oscillated from the main oscillator 11. The two reference electrical signals are supplied to the laser driving circuit 14 for carrying out frequency selection and amplitude modulation, and a distance measuring light having the frequency $f_1$ or $f_2$ is selectively outputted from the laser 15 connected between output terminals of the laser driving circuit 14. In addition, the reference electrical signal selected in the laser driving circuit 14 is supplied to the first A/D converter 31 as well. Since the reference electrical signal and the distance measuring light upon its application have the same phase information, in this embodiment, the reference electrical signal is directly supplied to the first A/D converter 31.

On the other hand, the APD 21 receives the distance measuring light which is emitted from the laser 15 to an object to be measured and reflected from the object to be measured to output an electrical signal corresponding to the received distance measuring light (hereinafter referred to as "a received electrical signal" for short) The received electrical signal is supplied to the second A/D converter 32 through the amplifier 22.

In addition to the first and second PLL circuits 12 and 13, the third PLL circuit 60 is connected to the main oscillator 11. The third PLL circuit 60 outputs a sampling signal having a frequency $f_s$ from the signal having the frequency $f_0$ oscillated from the main oscillator 11 to supply the sampling signal to each of the first and second A/D converters 31 and 32. The first A/D converter 31 A/D-converts the reference electrical signal based on the frequency $f_s$ of the sampling signal, and the second A/D converter 32 A/D-converts the received electrical signal based on the frequency $f_s$ of the sampling signal. Both the individual digital data obtained through the A/D conversion in the first and second A/D converters 31 and 32 is sent to the phase difference arithmetic operation circuit 40 in which a phase difference between the reference electrical signal and the received electrical signal is in turn arithmetically operated. The arithmetic operation results are inputted to the CPU 51 to be converted into data of a distance therein. Note that while not illustrated, the CPU 51 can supply a frequency selection signal used to select a frequency of the reference electrical signal to the laser driving circuit 14, and also can communicate data such as the detected distance data to an external interface. In addition, the reference electrical signal from the laser driving circuit 14 is directly inputted to the first A/D converter 31. However, alternatively, the laser (the laser 15) and the light receiving circuit (the APD 21) are disposed at a reference distance apart from each other, and in this state, the reference electrical signal may be inputted to the first A/D converter 31. In this case, since phase delays due to a change in temperature in the light emitting system and the light receiving system can be cancelled, the higher precise measurement can be realized.

Next, the principles of the arithmetic operation for a distance to the object to be measured will be described hereinafter.

In this embodiment, the frequency $f_s$ of the sampling signal, and the frequencies $f_1$ and $f_2$ of the reference electrical signal show the relationship meeting Equation 2. When the distance measuring light modulated with the reference electrical signal having the frequency $f_1$ is applied to the object to be measured, the received electrical signal obtained from the distance measuring light reflected by the object to be measured has also the frequency $f_1$. At this time, if the reference electrical signal and the received electrical signal are A/D-converted using the sampling signal having the frequency $f_s$, then A/d-conversion is carried out for the individual wavelengths. FIGS. 2(a), 2(b), and 2(c) show conceptual diagrams of waveforms of the signals such as the signal restored by the phase difference arithmetic operation circuit 41. As shown in the drawings, when the reference electrical signal and the received electrical signal each having the frequency $f_1$ are A/D-converted using the sampling signal having the frequency $f_s$, the signal having an absolute value of a frequency difference $(f_1-f_s)$ between the frequencies $f_1$ and $f_s$ as its frequency is obtained with a period which is n times as long as that of the reference electrical signal. Since this signal is down converted while having the phase similar to that of each of the reference electrical signal and the received electrical signal each having the frequency $f_1$, the phase can be obtained by analyzing this signal. When the k-th digital data obtained through the A/D conversion is assigned $S_k$, the phase at this time is expressed by Equation 3:

$$\Phi = \arctan\left(\frac{\sum_{k=0}^{n-1} S_k \cos\left(\frac{2\pi k}{n}\right)}{\sum_{k=0}^{n-1} S_k \sin\left(\frac{2\pi k}{n}\right)}\right) \quad \text{Equation 3}$$

where k is an integral number (0, 1, . . . (n-1)).

Equation 3 means that the phase is obtained by utilizing the Fourier transform, and hence the phase of each of the reference electrical signal and the received electrical signal is arithmetically operated based on Equation 3. The phase of the reference electrical signal is subtracted from the phase of the received electrical signal to obtain a phase difference $\Delta\Phi$. The phase difference $\Delta\Phi$ is then transformed into the distance based on Equation 1. While above, the description has been given with respect to the case where the frequency of the reference electrical signal is $f_1$, this is also applied to a case where the frequency of the reference electrical signal is $f_2$.

In the actual measurement, the distance measuring lights which are modulated with the reference electrical signal having the frequencies $f_1$ and $f_2$ are alternately applied to the object to be measured. As a result, the received electrical signals also have the frequencies $f_1$ and $f_2$. In a case where the frequency of the reference electrical signal is arbitrarily set, the phase difference arithmetic operation circuit 41 for arithmetically operating Equation 3 is required by the same number as that of kinds of the frequencies of the reference electrical signal. In this embodiment, the reference electrical signal has the two frequencies. Accordingly, $f_1$ and $f_2$, two phase difference arithmetic operation circuits are required, and it is difficult to miniaturize the circuit. However, the frequency $f_s$ of the sampling signal, and the frequencies $f_1$ and $f_2$ of the reference electrical signal are set so as to meet Equation 2, whereby the phase difference arithmetic operation can be carried out using one and the same phase difference arithmetic operation circuit 41. It will hereinafter be described that the phase difference arithmetic operation can be carried out using one and the same phase difference arithmetic operation circuit 41.

When the received electrical signal having the frequency $f_1$ is assigned $F_1$, and the received electrical signal having the frequency $f_2$ is assigned $F_2$, the respective phases are observed as showing difference values. When these phases are assigned $\Phi_1$ and $\Phi_2$, respectively, the received electrical signals can be expressed in the form of $F_1=\sin(2\Pi f_1 t+\Phi_1)$ and $F_2=\sin(2\Pi f_2 t+\Phi_2)$, respectively. The k-th digital data of the individual digital data which is obtained by A/D-converting those received electrical signals is expressed in the form of Equation 4 using Equation 2:

$$F_1 = \sin\left(2\pi f_1 \frac{k}{f_S} + \Phi_1\right) = \sin\left(2\pi \frac{n+1}{n} k + \Phi_1\right) \quad \text{Equation 4}$$

$$F_2 = \sin\left(2\pi f_2 \frac{k}{f_S} + \Phi_2\right) = \sin\left(2\pi \frac{n-1}{n} k + \Phi_2\right)$$

When the k-th digital data of the received electrical signal is expressed by $F_1$ shown in Equation 4, the phase of the received electrical signal is expressed in the form of Equation 5 by substituting $F_1$ for Equation 3:

$$\tan\Phi_1 = \frac{\sum_{k=0}^{n-1} \sin\left(2\pi \frac{n+1}{n} k + \Phi_1\right) \times \cos\left(\frac{2\pi k}{n}\right)}{\sum_{k=0}^{n-1} \sin\left(2\pi \frac{n+1}{n} k + \Phi_1\right) \times \sin\left(\frac{2\pi k}{n}\right)} \quad \text{Equation 5}$$

$$= \frac{\frac{1}{2}\left\{\sum_{k=0}^{n-1} \sin\left(\frac{n+2}{n} 2\pi k + \Phi_1\right) + \sum_{k=0}^{n-1} \sin(2\pi k + \Phi_1)\right\}}{-\frac{1}{2}\left\{\sum_{k=0}^{n-1} \cos\left(\frac{n+2}{n} 2\pi k + \Phi_1\right) - \sum_{k=0}^{n-1} \cos(2\pi k + \Phi_1)\right\}}$$

First terms of a denominator and a numerator in Equation 5 are total sums of respective periodic functions for one period to become zero, respectively, and hence a right side of Equation 5 becomes $\tan\Phi_1$.

On the other hand, when the k-th digital data of the received electrical signal is expressed by $F_2$ shown in Equation 4, the phase of the received electrical signal is expressed in the form of Equation 6 in a manner similar to Equation 5:

$$\tan\Phi_2 = \frac{\frac{1}{2}\left\{\sum_{k=0}^{n-1} \sin(2\pi k + \Phi_2) + \sum_{k=0}^{n-1} \sin\left(\frac{n-2}{n} 2\pi k + \Phi_2\right)\right\}}{-\frac{1}{2}\left\{\sum_{k=0}^{n-1} \cos(2\pi k + \Phi_2) - \sum_{k=0}^{n-1} \cos\left(\frac{n-2}{n} 2\pi k + \Phi_2\right)\right\}} \quad \text{Equation 6}$$

Second terms of a denominator and a numerator in Equation 6 becomes zero, respectively, from the same reason as that in Equation 5, and hence a right side of Equation 6 becomes $-\tan\Phi_1$. Consequently, a sign is merely inverted in the arithmetic operations for the phases of the received electrical signals having the frequencies $f_1$ and $f_2$ so that the arithmetic operations for the phases of the received electrical signals having the frequencies $f_1$ and $f_2$ can be carried out in the same arithmetic operation circuit. As a result, the light wave distance measuring apparatus including the phase difference arithmetic operation circuit 41 can be miniaturized. Note that the inversion in sign can be corrected in the CPU 51 or the like. While the case of the received electrical signal has been described above, this is also applied to the case of the reference electrical signal.

In addition, when the safety standards for the laser are taken into consideration, the distance measuring light can also be emitted in the form of burst light. Meeting the safety standards is very important for the laser device since there is no need to take various danger protecting measures for the laser device. The safety standards for the laser are regulated by the total power of the light for a fixed period of time. Thus, when the distance measuring light is emitted in the form of the burst light, the instantaneous light power can be increased to increase the detection sensitivity of the distance measuring light upon its reception as compared with the case where the distance measuring light is continuously emitted within the safety standards of the laser. Note that the laser driving circuit 14 is adapted to emit the distance measuring light in the form of the burst light by multiplying the reference electrical signal by the burst signal.

In addition, in order to realize the high speed promotion for the distance arithmetic operation, the phase difference arithmetic operation circuit 41 can also remove D.C. components contained in the digital data of the reference electrical signal and the received electrical signal based on the received electrical signal as the digital data, during non-light emission of the distance measuring light, which is obtained by A/D-converting the reflected distance measuring light in the second A/D conversion circuit 32. Each of the reference electrical signal and the received electrical signal is expressed in the form of addition of the D.C. component and the A.C. component of the signal, and only the A.C. component of the signal is required for the phase arithmetic operation. However, when the wavelength of the restored signal is not integral multiples of the wavelength of the original signal, the D.C. component of the signal is contained in the phase arithmetic operation. Then, the received electrical signal during non-light emission of the distance measuring light is regarded as a D.C. component, the D.C. component is A/D-converted by the second A/D conversion circuit 32 to obtain digital data $S_{kDC}$, and a value of the $S_{kDC}$ is arithmetically operated based on Equation 3. The value is subtracted from the phase during light emission of the distance measuring light so that the D.C. component of the signal can be removed. As a result, even when the wavelength of the restored signal is shorter than one wavelength of the original signal, the phase arithmetic operation can be carried out, and hence the high speed promotion of the distance arithmetic operation can be realized. Note that even when the digital data $S_k$ is replaced with ($S_k$-$S_{kDC}$) in Equation 3, the D.C. component of the restored signal can be removed. This is effective when the D.C. component of the original signal can be regarded as a constant value. That is, the digital data $S_{kDC}$ has only to be measured with respect to one point of the received electrical signal during non-light emission of the distance measuring light, and hence the speed of the distance arithmetic operation can be increased.

In addition, in the above-mentioned embodiment, the description has been given with respect to the case of one kind of sampling signal. However, the sampling signal may contain at least two kinds of signals which are identical in frequency to each other but are different in phase from each other. In this connection, the phase difference detecting circuit 41 can restore the reference electrical signal and the received electrical signal by rearranging the individual digital data obtained through the A/D conversion in the A/D converter. With this construction, at least two points of each of the reference electrical signal and the received electrical signal for one period can be A/D-converted, so the number of digital data increases, and hence the measurement precision can be enhanced. In addition, the A/D conversion can be shared among the inexpensive A/D converters, and as a result, the highly precise distance measurement can be carried out with the inexpensive light wave distance measuring apparatus. It is previously made clear that the frequency of the signal to be restored has the frequency difference between the reference electrical signal and the sampling signal. Thus, the signal can be restored by suitably rearranging the individual digital data based on that frequency. Here, when it is supposed that the sampling signal contains m signals which are different in phase from each other, the phase difference arithmetic operation circuit 41 has to include a memory portion having (m×n) addresses. Thus, when the reference electrical signal or the received electrical signal is restored, the digital data stored in the respective addresses can be read out.

EXAMPLE 1

An example in which a distance to an object to be measured was actually measured in order to verify the availability of the light wave distance measuring apparatus of this embodiment will hereinafter be described.

A quartz oscillator was used as the main oscillator 11 and oscillates at a frequency of 13.3 MHz. The oscillation signal having the frequency $f_0$ from the oscillator 11 was inputted to each of the first to third PLL circuits 12, 13, and 60 through which the reference electrical signal was obtained in the form of a sine wave signal having the frequencies $f_1$ and $f_2$ of 46.7 MHz and 13.3 MHz, respectively, and the sampling signal was obtained in the form of two kinds of signals each having the frequency $f_s$ of 50 MHz and a phase shifted by 90 degrees from each other. The frequencies $f_1$ and $f_2$ of the reference electrical signal, and the frequency $f_s$ of each sampling signal met Equation 2, and thus n at that time was 15. An infrared laser having a wavelength of 785 nm was used as the laser 15. The laser beam was amplitude-modulated with the reference electrical signal, and the reference electrical signal was multiplied by the burst signal in the laser driving circuit 14 so that a light emission time of 3 μs per 18 μs was obtained. Then, the distance measuring light having a light emission state shown in FIGS. 3(a) to 3(c) was emitted from the laser 15 to the object to be measured. Note that the instantaneous maximum power of the distance measuring light emitted in the form of the burst light shown in the drawings was increased up to the power which is 6 times as large as that of the specified value (3.7 mW at maximum) in the safety standards, i.e., 22.2 mW while meeting the most severe safety standards, IEC60825-2, of the safety standards of the laser. An A/D converter having an arithmetic operation speed of 50 MHz was used as each of the first and second A/D converters 31 and 32. Note that the second A/D converter 32 was constituted by two A/D converters each having an arithmetic operation speed of 50 MHz, and hence the A/D conversion was substantially carried out at the sampling frequency of 100 MHz. At this time, the received electrical signal was sampled at two points per wavelength, and hence the original signal for one wavelength was restored using the sampling data for 15 wavelengths.

First of all, the reference electrical signal and the received electrical signal were verified which were restored in the phase difference detecting circuit when white papers were disposed at distances of 100 mm, 2,000 mm, and 4,000 mm from the distance measuring apparatus, and when no white paper was disposed. The measurement results in these cases are shown in FIGS. 4(*a*), 4(*b*), 4(*c*), and 4(*d*), respectively. Note that in these drawings, a solid line represents a waveform of the reference electrical signal, and a broken line represents a waveform of the received electrical signal. From these drawings, it is understood that the received electrical signal is restored even in the case of 4,000 mm which is regarded as a maximum detection distance in the specification.

Figure 5:
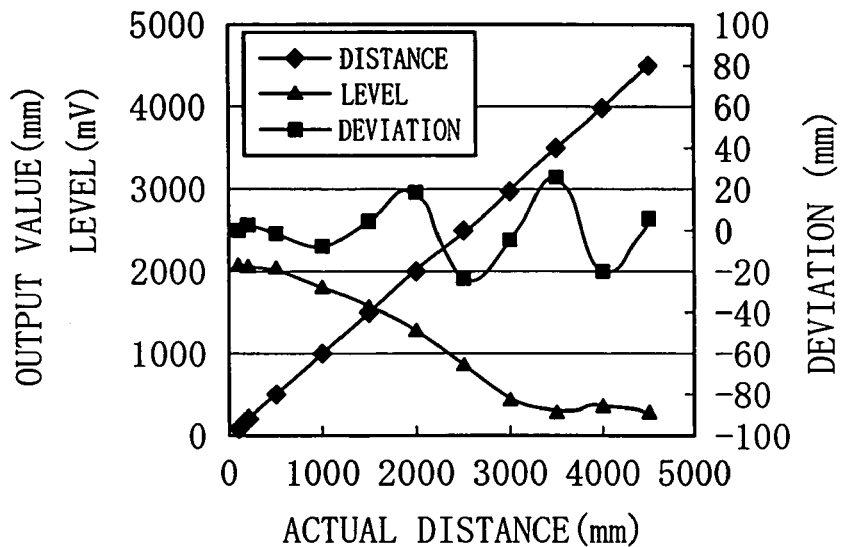
FIG. 5 is a graphical representation showing examination results.

Next, distances, their deviations, and levels of the received electrical signals were measured in case of the disposition of the same white paper as that of the above case. The measurement results are shown in FIG. 5. As apparent from FIG. 5, it is understood that though the level of the received electrical signal decreases as the distance to be measured increases, the satisfactory measurement results are obtained for both the distance and the deviation even in the case of 4,500 mm exceeding the maximum detection distance (4,000 mm) in reflection of the measurement results shown in FIGS. 4(*a*) to 4(*d*).

Figure 6:
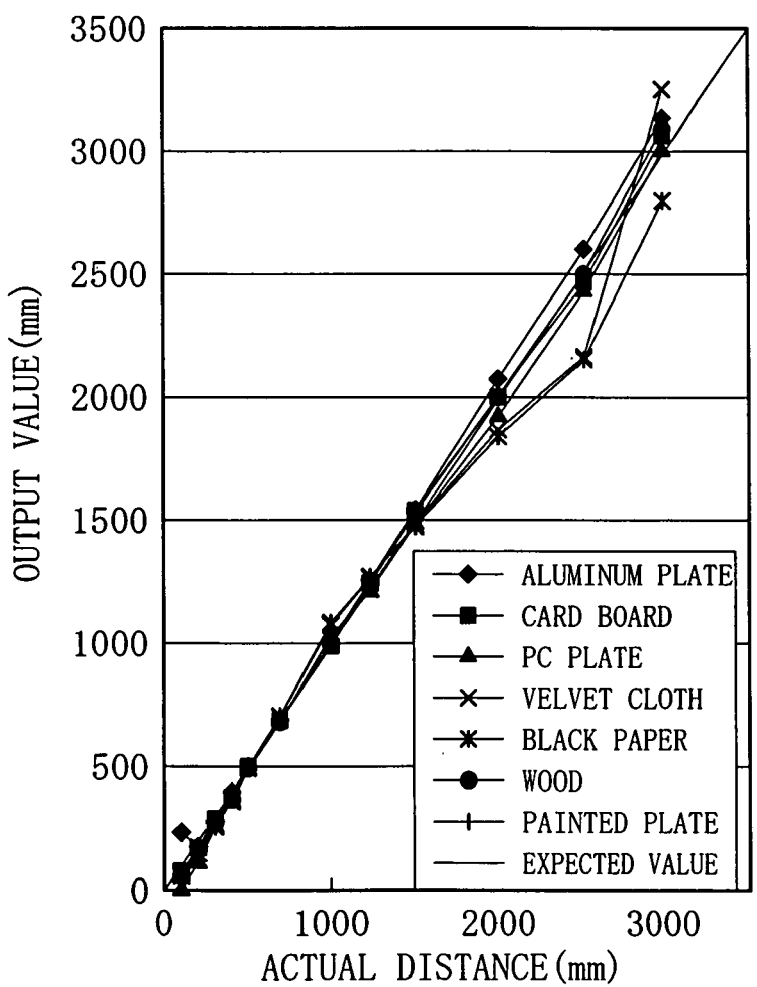
FIG. 6 is a graphical representation showing examination results.
Figure 7:
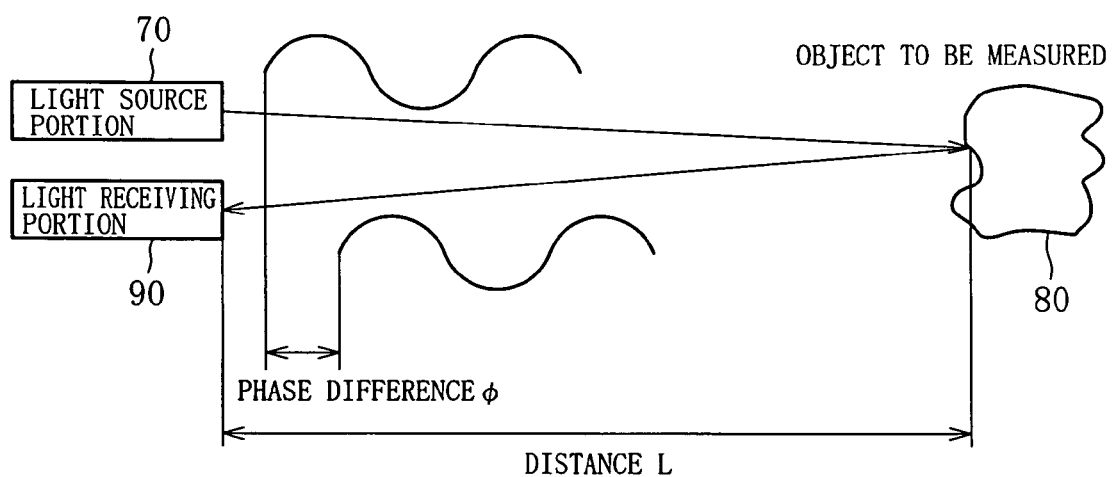
FIG. 7 is a conceptual view showing the measurement principles of a light wave distance measuring apparatus of an AM system.

Finally, the distance measurements were carried out for objects of measurement each having the quality of the material other than the white paper. The measurement results are shown in FIG. 6. Note that a solid line in the drawing represents expected values. An aluminum plate, a card board, a PC plate, a velvet cloth, a black paper, wood, and a painted plate were adopted as the objects of the distance measurement. As can be seen from the drawing, it is understood that the excellent distance measurement results are obtained irrespective of the qualities of the materials of the objects of distance measurement.

What is claimed is:

1. A wave light distance measuring apparatus, comprising:
   a light source portion for applying a distance measuring light amplitude-modulated with a reference electrical signal as a sine wave signal having a predetermined frequency to an object to be measured;
   a light receiving portion for receiving the distance measuring light reflected by the object to be measured to convert the received distance measuring light into a received electrical signal;
   A/D conversion means for A/D-converting the reference electrical signal and the received electrical signal based on a sampling signal;
   phase difference detecting means for detecting phases of the reference electrical signal and the received electrical signal which are A/D-converted by the A/D conversion means to subtract the phase of the reference electrical signal from the phase of the received electrical signal, whereby detecting a phase difference between the reference electrical signal and the received electrical signal; and
   distance detecting means for detecting a distance to the object to be measured based on the phase difference detected by the phase difference detecting means,
   wherein the reference electrical signal has two kinds of frequencies which are different from each other and any one of which is alternatively selected,
   the sampling signal is synchronized with the reference electrical signal having the two kinds of frequencies once every n times, and a frequency of the sampling signal is equal to an average value of the two kinds of frequencies of the reference electrical signals, and
   the A/D conversion means carries out at least one A/D conversion per period of the reference electrical signal and the received electrical signal based on the sampling signal.

2. A light wave distance measuring apparatus according to claim 1, wherein when one of the two kinds of frequencies of the reference electrical signal is assigned $f_1$, the other is assigned $f_2$, and the frequency of the sampling signal is assigned $f_s$, a following relationship is met:

$$f_1/f_s = (n+1)/n$$

$$f_2/f_s = (n-1)/n.$$

3. A light wave distance measuring apparatus according to claim 2, wherein the distance measuring light is burst-emitted.

4. A light wave distance measuring apparatus according to claim 3, wherein the phase difference detecting means removes a D.C. component contained in digital data of the reference electrical signal and the received electrical signal based on the received electrical signal during non-light emission of the distance measuring light converted into the digital data by the A/D conversion means.

5. A light wave distance measuring apparatus according to claim 4, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

6. A light wave distance measuring apparatus according to claim 3, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

7. A light wave distance measuring apparatus according to claim 2, wherein the phase difference detecting means removes a D.C. component contained in digital data of the reference electrical signal and the received electrical signal based on the received electrical signal during non-light emission of the distance measuring light converted into the digital data by the A/D conversion means.

8. A light wave distance measuring apparatus according to claim 7, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

9. A light wave distance measuring apparatus according to claim 2, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

10. A light wave distance measuring apparatus according to claim 1, wherein the distance measuring light is burst-emitted.

11. A light wave distance measuring apparatus according to claim 10, wherein the phase difference detecting means removes a D.C. component contained in digital data of the reference electrical signal and the received electrical signal based on the received electrical signal during non-light emission of the distance measuring light converted into the digital data by the A/D conversion means.

12. A light wave distance measuring apparatus according to claim 10, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

13. A light wave distance measuring apparatus according to claim 11, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

14. A light wave distance measuring apparatus according to claim 1, wherein the phase difference detecting means removes a D.C. component contained in digital data of the reference electrical signal and the received electrical signal based on the received electrical signal during non-light emission of the distance measuring light converted into the digital data by the A/D conversion means.

15. A light wave distance measuring apparatus according to claim 14, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

16. A light wave distance measuring apparatus according to claim 1, wherein the sampling signal contains at least two kinds of signals which are identical in frequency to each other, but are different in phase from each other, and the phase difference detecting means restores the reference electrical signal and the received electrical signal by rearranging the individual digital data obtained through the A/D conversion in the A/D conversion means.

* * * * *